US007163303B1

(12) United States Patent
Venkatram

(10) Patent No.: US 7,163,303 B1
(45) Date of Patent: Jan. 16, 2007

(54) ILLUMINATED POINTER FOR INSTRUMENT GAUGES

(75) Inventor: Sanjiv Venkatram, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 107 days.

(21) Appl. No.: 10/847,010

(22) Filed: May 17, 2004

(51) Int. Cl.
*G01D 11/28* (2006.01)
(52) U.S. Cl. ............................... 362/26; 362/23
(58) Field of Classification Search ............ 362/23
See application file for complete search history.

(56) References Cited

U.S. PATENT DOCUMENTS

| 2,664,849 | A | * | 1/1954 | Nallinger ............... 362/29 |
| 4,218,726 | A | * | 8/1980 | Fukasawa et al. ........... 362/23 |
| 4,258,643 | A | | 3/1981 | Ishikawa et al. |
| 4,274,358 | A | * | 6/1981 | Nakamura et al. ........... 362/28 |
| 4,959,759 | A | | 9/1990 | Kohler |
| 5,199,376 | A | | 4/1993 | Pasco |
| 5,706,757 | A | | 1/1998 | Hashimoto et al. |
| 6,025,820 | A | | 2/2000 | Salmon et al. |
| 6,302,552 | B1 | | 10/2001 | Ross et al. |
| 6,663,251 | B1 | * | 12/2003 | Calvert ............... 362/23 |

* cited by examiner

*Primary Examiner*—Ali Alavi
(74) *Attorney, Agent, or Firm*—Rader, Fishman & Grauer PLLC

(57) ABSTRACT

An illuminated pointer for an instrument includes an arm section for indicating a display parameter on the instrument, a tail section, and a bridge section extending between the tail section and the arm section. The tail section is configured to focus light received from a light source through the bridge section and into the arm section to more evenly illuminate and/or enhance the brightness of the arm section.

23 Claims, 5 Drawing Sheets

ILLUMINATED POINTER FOR INSTRUMENT GAUGES

FIELD OF THE INVENTION

The present invention relates generally to illuminated pointers for instrument gauges and, more particularly, to an illuminated pointer with improved illumination characteristics.

BACKGROUND OF THE INVENTION

Automotive instrument gauges, such as speedometers, tachometers, fuel level indicators, and the like, typically employ face plates with legends and other indicia. Pointer devices are used in conjunction with these face plates and are arranged to rotate or move along the legends or indicia to reveal certain vehicle operating parameters to the vehicle operator, such as, for example, vehicle speed, engine speed, and fuel level.

The pointer-devices used with automotive instrument gauges are typically illuminated so that a vehicle operator may clearly view the pointer device at night or during low light conditions. This illumination is typically indirect and provided by a lamp or other light source, which is positioned below the base of each pointer device or arranged around the periphery of the instrument gauge face plate. Pointer devices are generally made of a light conducting material so that light from the lamp may be conducted by the pointer device for improved visibility.

Illuminated pointer devices typically employ reflection surfaces or "facets" to reflect light received from a light source throughout the pointer for consistent illumination. Illuminated pointers used on instrument gauges today use a number of facets (see, e.g., FIGS. 2 and 3) to redirect the light throughout the pointer. However, conventional multi-facet pointer designs do not provide adequate brightness or allow for even lighting of the pointer as the pointer moves relative to the gauge face plate. The pointer illumination can be made even only by compromising the brightness of the pointer, thus affecting the level of illumination perceived by the vehicle operator. Accordingly, a need exists for an improved illuminated pointer that is brighter and more evenly illuminated throughout various angular positions of the pointer relative to the instrument gauge face.

SUMMARY OF THE INVENTION

An illuminated pointer for an instrument is provided. In an embodiment of the invention, the illuminated pointer includes an arm section for indicating a display parameter on the instrument, a tail section, and a bridge section extending between the tail section and the arm section. The tail section is configured to focus light received from the light source through the bridge section and into the arm section to more evenly illuminate and/or enhance the brightness of the arm section.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION

Figure 1:
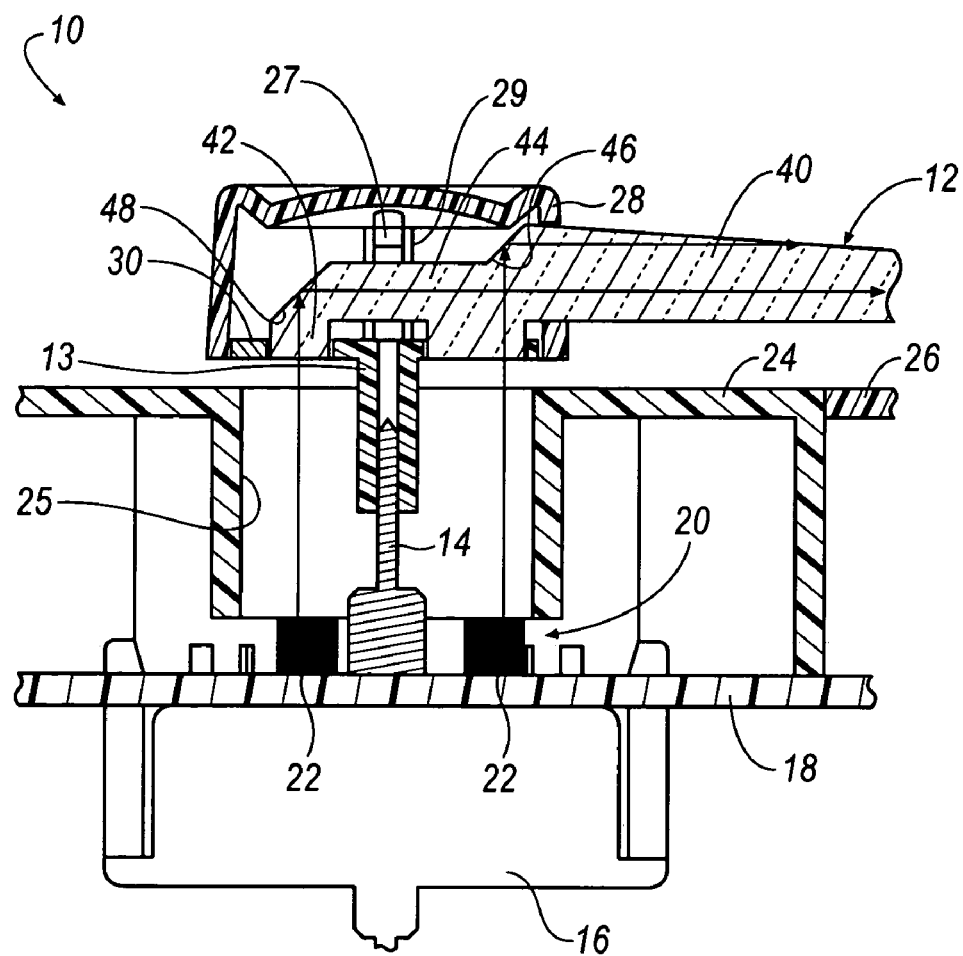
FIG. 1 is a partial cross-sectional view of an instrument including an illuminated pointer according to an embodiment of the present invention.

Referring now to the drawings, several embodiments of the present invention are shown in detail. Although the drawings represent some embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

Figure 2:
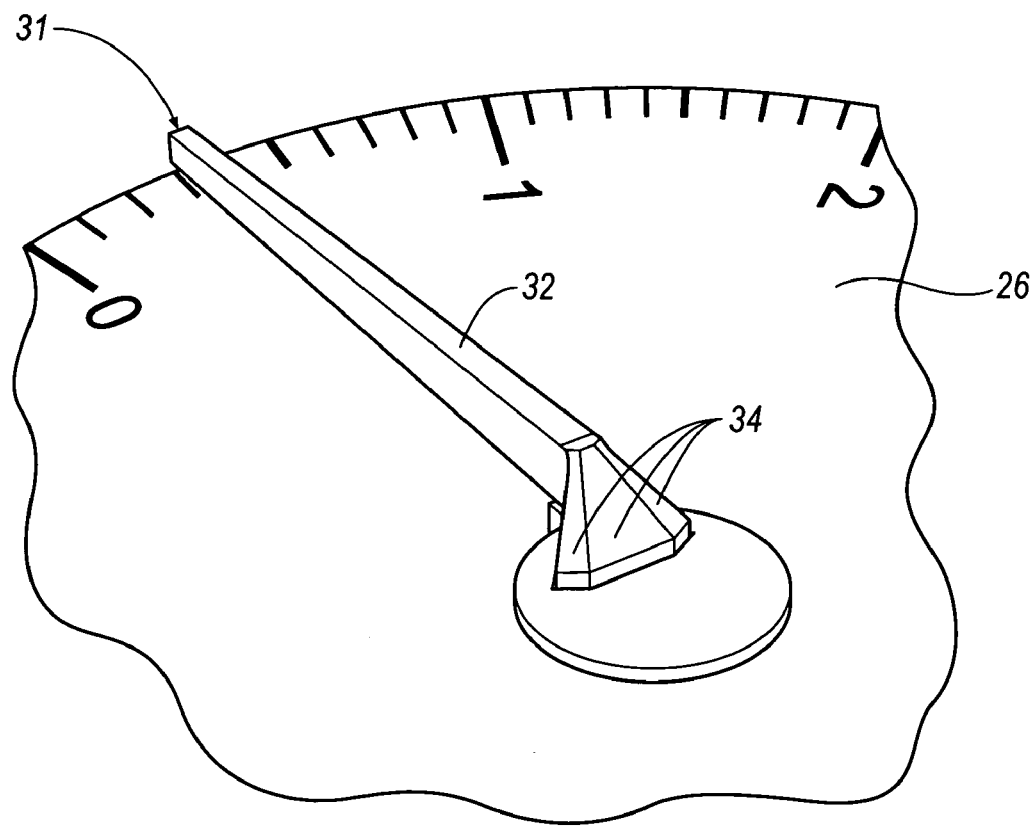
FIG. 2 is a perspective view of an illuminated pointer according to the prior art.

Referring to FIGS. 1 and 2, an instrument 10, such as a dial gauge used in a motor vehicle to indicate vehicle speed, is shown that includes an illuminated pointer 12 according to an embodiment of the present invention. Pointer 12 is supported by a base member 13 that is secured for rotation with an output 14 of a motor 16. Motor 16 is supported by a printed circuit board 18, which includes a light source 20 having at least one source of light 22, such as, for example, an incandescent lamp or light emitting diode (LED), and preferably, at least two sources of light 22 to ensure adequate illumination of pointer 12.

To direct the light emitted from light source 20 into pointer 12, instrument 10 may also include a reflector member 24 made from a light reflecting material and having a generally cylindrical opening 25 through which the light emitted from light source 20 is directed. An applique 26 surrounds reflector member 24 and includes legends or other indicia that are displayed on the instrument face and cooperate with pointer 12 to indicate a display parameter, such as vehicle speed. Instrument 10 may also include a cap 28 for hiding a portion of pointer 12 that does not need to be viewed during operation of instrument 10 and a counterweight 30 for balancing the portion of pointer 12 that extends beyond cap 28. Cap 28 may include pins 27 that can be used to secure cap 28 to towers 29, which form part of pointer 12 in the illustrated embodiment.

Figure 3:
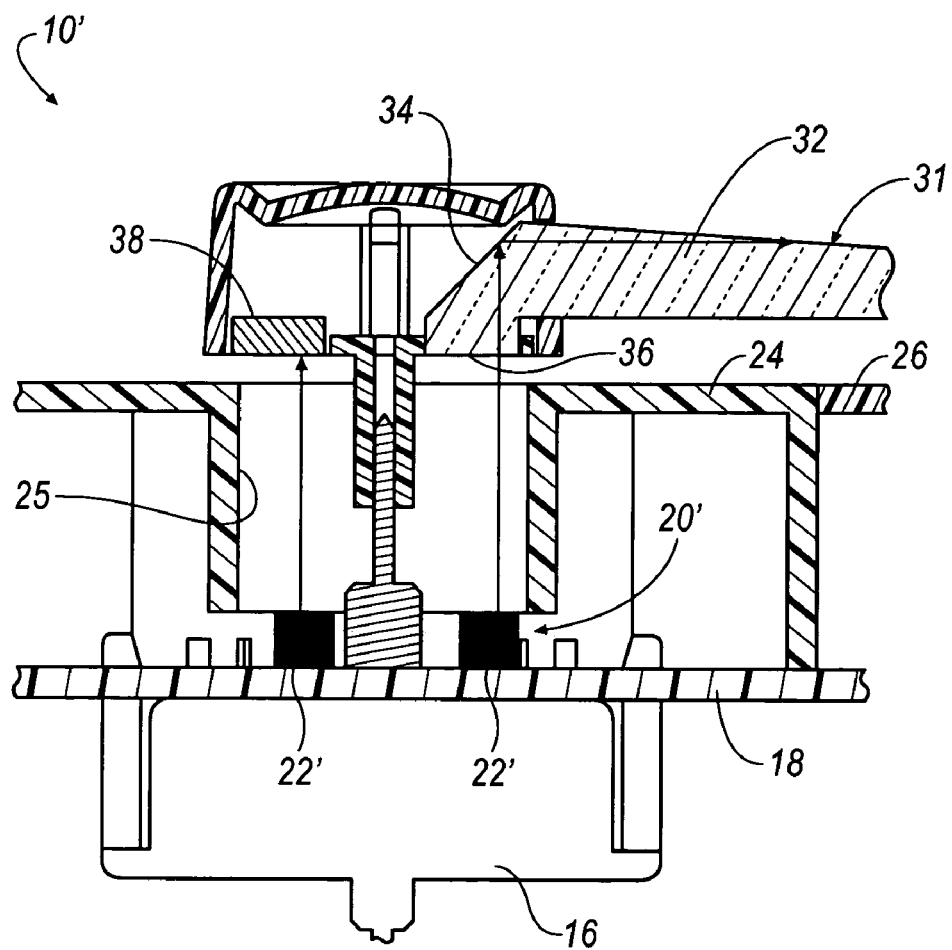
FIG. 3 is a partial cross-sectional view of an instrument including an illuminated pointer according to the prior art.
Figure 4:
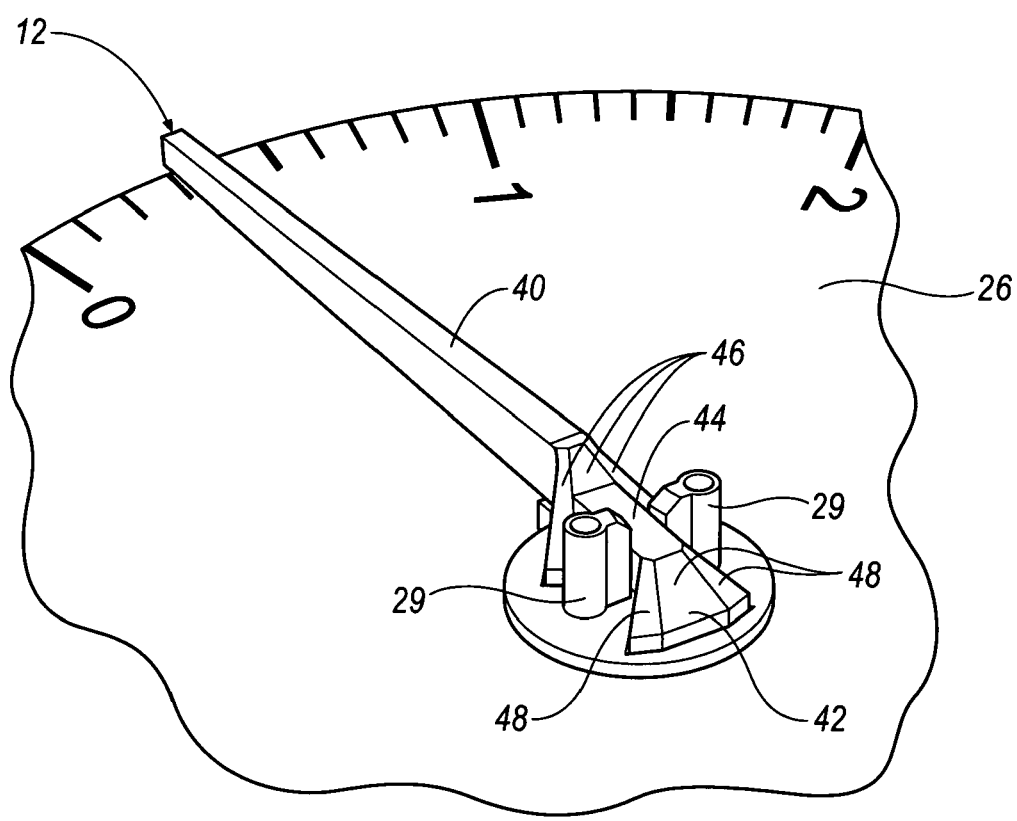
FIG. 4 is a perspective view of the illuminated pointer according to an embodiment of the present invention.
Figure 5:
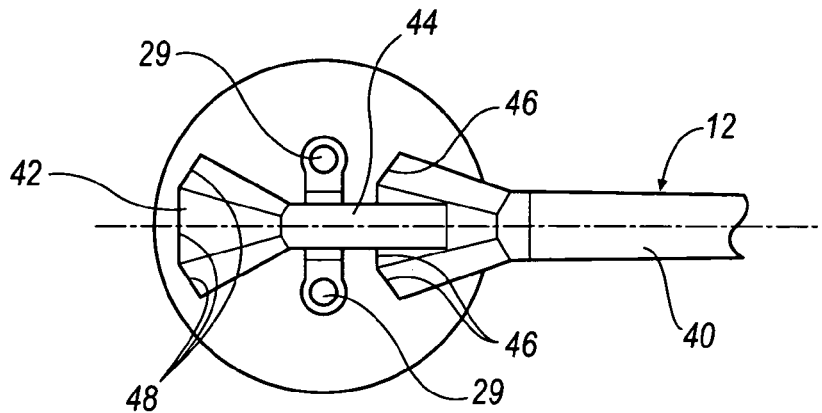
FIG. 5 is a top view of an illuminated pointer according to an embodiment of the invention.

To fully appreciate the various features of the present invention, a prior art pointer 31 is illustrated in FIGS. 2 and 3. As shown in FIG. 2, pointer 31 includes an arm section 32 having a number of light reflecting surfaces or "facets" 34 that reflect light entering a bottom surface 36 (FIG. 3) of pointer 31 throughout arm section 32. Prior art pointer 31 is made of a light conducting material that is illuminated by the light received from a light source. For example, when installed in an instrument 10' (FIG. 3), facets 34 reflect light generated by light source 20' throughout arm section 32 at a first level of brightness dependent upon the amount of light generated by light source 20'. To balance pointer 31, instrument 10' includes a counterweight 38, which is generally larger than counterweight 30 for reasons that will be described below.

Referring to FIGS. 1 and 4–7, illuminated pointer 12 of the present invention will be described in greater detail. In an embodiment, illuminated pointer 12 includes an arm section 40 for indicating a display parameter on the instrument, a tail section 42, and a bridge section 44 extending between tail section 42 and arm section 40. Pointer 12 is made of a light conducting material that is illuminated by the light received from light source 20.

To reflect light received by pointer 12 throughout arm section 40, arm section 40 is provided with at least one light reflecting surface or "facet" 46. Depending on the size of pointer 12, arm section 40 may include two or more light reflecting facets 46 to reflect more light throughout arm section 40 and increase its brightness. Similarly, tail section 42 is also provided with at least one light reflecting surface or "facet" 48 configured to focus light received from light source 20 through bridge section 44 and into arm section 40. Depending on the size of pointer 12, tail section 42 may include two or more light reflecting facets 48 configured to focus light received from light source 20 through bridge section 44 and into arm section 40. Further, tail section 42 and bridge section 44 may be shorter in height than arm section 40 to more evenly distribute light throughout arm section 40 (see, e.g., FIG. 1).

Thus, as will be appreciated with reference to FIGS. 1 and 3, the brightness of pointer 12 may be enhanced, particularly when compared to the prior art pointer 31, by reflecting more of the light produced by light source 20 into arm section 40 and more evenly distributing the light throughout arm section 40. This feature is particularly useful when light source 20 includes two or more spaced-apart sources of light 22, which allows at least one of arm section 40 or tail section 42 to be positioned over or near one of sources of light 22 at any given position of pointer 12 relative to applique 26. Thus, depending on the amount of travel of pointer 12, light source 20 (including sources of light 22) may be positioned such that the brightness of arm section 40 is maintained for various positions of arm section 40 relative to applique 26.

Depending on the application, arm section 40, tail section 42 and bridge section 44 may be configured to include various shapes and angled facets to properly distribute the light throughout arm section 40 and, therefore, is not necessarily limited to the configurations shown in the drawings. For example, in the embodiment illustrated in FIG. 5, bridge section 44 is generally uniform along its length, having a width at the exit of tail section 42 substantially similar to the width at the entrance to arm section 40. Further, bridge section 44 is generally narrower in cross-section than the arm and tail sections 40, 42 to focus the light reflected by tail section 42 into the portion(s) of arm section 40 that requires enhanced brightness.

Figure 6:
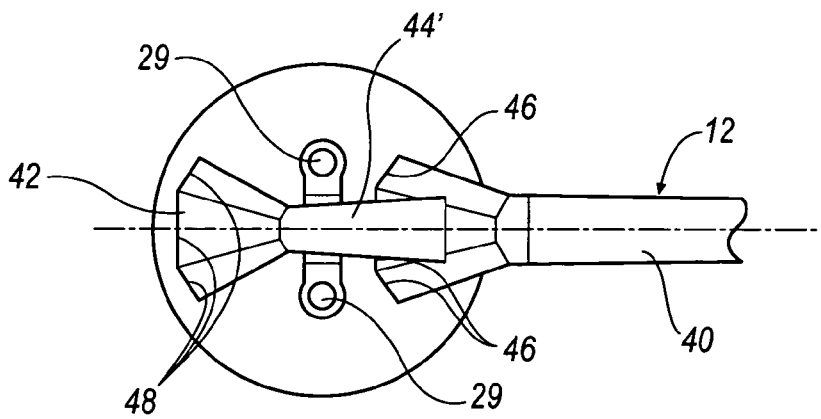
FIG. 6 is a top view of an illuminated pointer according to another embodiment of the invention.
Figure 7:
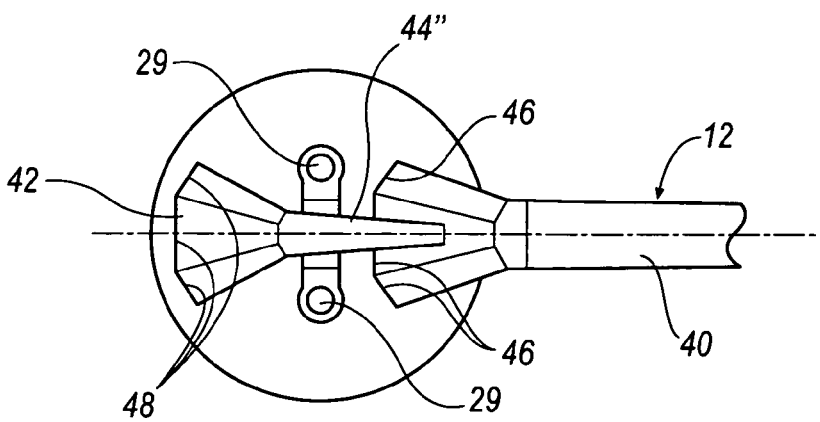
FIG. 7 is a top view of an illuminated pointer according to another embodiment of the invention.

However, as shown in an alternative embodiment illustrated in FIG. 6, bridge section 44' may be wider at the entrance to arm section 40 than at the exit of tail section 42. In this embodiment, light reflected forward through bridge section 44' from tail section 42 will be dispersed as it enters arm section 40 to enhance the illumination of pointer 12 near the entry of arm section 40. In another embodiment shown in FIG. 7, bridge section 44" is narrower at the entrance to arm section 40 than at the exit of tail section 42. In this manner, light reflected and focused forward through bridge section 44" from tail section 42 will be concentrated farther down arm section 40 to enhance the illumination of pointer 12 near the tip of arm section 40.

For comparison, the illumination characteristics of prior art pointer 31 and pointer 12 according to the present invention are provided below in Tables 1 and 2, respectively.

In this comparison, each of prior art pointer 31 and pointer 12 were installed in a dial gauge instrument, similar to instrument 10 described above, for measuring engine speed (RPM) in a motor vehicle.

TABLE 1

Prior Art Pointer (31) Brightness (Nits)

| Pointer Position | 1 mm From Cap | Middle of Pointer | 1 mm from Pointer Tip |
|---|---|---|---|
| "0" RPM | 3.63 | 4.95 | 9.35 |
| "2500" RPM | 3.61 | 5.68 | 9.24 |
| "4000" RPM | 3.70 | 5.01 | 8.35 |

TABLE 2

Inventive Pointer (12) Brightness (Nits)

| Pointer Position | 1 mm From Cap | Middle of Pointer | 1 mm from Pointer Tip |
|---|---|---|---|
| "0" RPM | 9.93 | 9.02 | 10.51 |
| "2500" RPM | 10.00 | 10.02 | 10.83 |
| "4000" RPM | 9.95 | 10.18 | 10.28 |

As will be appreciated, the present invention provides increased and more even illumination of pointer 12 by collecting, reflecting, and focusing more of the light used to illuminate pointer 12 forward into arm section 40. However, due to the more efficient use of light by pointer 12, the present invention also allows an instrument to include smaller or fewer sources of light 22 without necessarily compromising the brightness of pointer 12. Further, unlike the prior art pointer 31, pointer 12 of the present invention requires a relatively small counterweight, due to the added weight of tail section 42. Moreover, the features of the present invention allow the illuminated pointer 12 to be used in various instrument designs with little or no modification.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. An illuminated pointer for an instrument including a light source, the pointer comprising:
   an arm section for indicating a display parameter on the instrument;
   a tail section;
   a bridge section extending between the tail section and the arm section, the bridge section being narrower in maximum width than the tail and arm sections; and wherein the arm section, the bridge section, and the tail section are made from a light conducting material and the tail section includes at least one light reflecting facet configured to focus the light received from the light source through the bridge section and into the arm section.

2. The illuminated pointer of claim 1, wherein the arm section includes at least one light reflecting facet configured to direct light received from the light source farther into the arm section.

3. The illuminated pointer of claim 1, wherein the arm section includes at least two light reflecting facets configured to direct light received from the light source farther into the arm section.

4. The illuminated pointer of claim 1, wherein the tail section includes at least two light reflecting facets configured to focus light received from the light source through the bridge section and into the arm section.

5. The illuminated pointer of claim 1, wherein the tail section is positioned such that the brightness of the arm section is maintained for various positions of the arm section relative to the instrument.

6. An illuminated pointer for an instrument including a light source, the pointer comprising:
   an arm section for indicating a display parameter on the instrument;
   a tail section;
   a bridge section being narrower in maximum width than the tail and arm sections, said bridge section extending between the tail section and the arm section; and
   wherein the sections are made from a light conducting material and the tail section is configured to focus light received from the light source, through the bridge section, and into the arm section such that the brightness of the arm section is maintained for various positions of the am section relative to the instrument.

7. The illuminated pointer of claim 6, wherein the arm section includes at least one light reflecting facet configured to direct light received from the light source farther into the arm section.

8. The illuminated pointer of claim 6, wherein the arm section includes at least two light reflecting facets configured to direct light received from the light source farther into the arm section.

9. The illuminated pointer of claim 6, wherein the tail section includes at least one light reflecting facet configured to focus light received from the light source through the bridge section and into the arm section.

10. The illuminated pointer of claim 6, wherein the tail section includes at least two light reflecting facets configured to focus light received from the light source through the bridge section and into the arm section.

11. The illuminated pointer of claim 6, wherein one end of the bridge section is narrower than the other end at one of an exit of the tail section and an entrance of the arm section.

12. An illuminated pointer for an instrument, the pointer comprising:
   a light conducting arm section for indicating a display parameter on the instrument, the arm section including at least one light reflecting facet;
   a light conducting tail section including at least one light reflecting facet; and
   a light conducting bridge section being narrower in maximum width than the tail and arm sections, said bridge section extending between the tail section and the arm section and configured to direct light received by the tail section into the arm section.

13. The illuminated pointer of claim 12, wherein the arm section includes at least two light reflecting facets configured to direct light farther into the arm section.

14. The illuminated pointer of claim 12, wherein the tail section includes at least two light reflecting facets configured to focus light through the bridge section and into the arm section.

15. The illuminated pointer of claim 12, wherein one end of the bridge section is narrower than the other end at one of an exit of the tail section and an entrance of the arm section.

16. An illuminated pointer assembly, comprising;
   an instrument having a parameter indicating face;
   a pointer movably mounted proximate to the parameter indicating face, the pointer including an arm section for indicating a display parameter on the instrument, a tail section, and a bridge section extending between the tail section and the arm section, said bridge section being narrower in maximum width than the tail and arm sections; and
   a light source positioned proximate to the pointer and configured to illuminate the pointer as the pointer moves relative to the parameter indicating face, the tail section configured to focus light received from the light source through the bridge section into the arm section.

17. The illuminated pointer assembly of claim 16, wherein the tail section includes at least one facet configured to focus light received from the light source through the bridge section and into the arm section.

18. The illuminated pointer assembly of claim 16, wherein the tail section includes at least two facets configured to focus light received from the light source through the bridge section and into the arm section.

19. The illuminated pointer assembly of claim 16, wherein the arm section includes at least one facet for reflect light received from the light source farther into the arm section.

20. The illuminated pointer assembly of claim 16, wherein the arm section includes at least two facets for reflecting light received from the light source farther into the arm section.

21. The illuminated pointer assembly of claim 16, wherein the light source includes at least two sources of light.

22. The illuminated pointer assembly of claim 16, wherein the light source is positioned such that the brightness of the arm section is maintained for various positions of the arm section relative to the parameter indicating face.

23. The illuminated pointer assembly of claim 16, wherein one end of the bridge section is narrower than the other end at one of an exit of the tail section and an entrance of the arm section.

* * * * *